United States Patent [19]

Kuwahara

[11] Patent Number: 4,658,596
[45] Date of Patent: Apr. 21, 1987

[54] REFRIGERATING APPARATUS WITH SINGLE COMPRESSOR AND MULTIPLE EVAPORATORS

[75] Inventor: Eiji Kuwahara, Fuji, Japan

[73] Assignee: Kabushiki Kaisha Toshiba, Tokyo, Japan

[21] Appl. No.: 790,172

[22] Filed: Oct. 22, 1985

[30] Foreign Application Priority Data

Dec. 1, 1984 [JP] Japan ............................ 59-254341

[51] Int. Cl.$^4$ ............................................ F25B 49/00
[52] U.S. Cl. .................................. 62/197; 62/228.3; 62/228.4
[58] Field of Search .............. 62/197, 199, 200, 228.1, 62/228.3, 228.4, 228.5

[56] References Cited

U.S. PATENT DOCUMENTS

| | | | |
|---|---|---|---|
| 4,362,027 | 12/1982 | Barbier | 62/212 |
| 4,487,031 | 12/1984 | Rogers et al. | 62/228.3 |
| 4,499,739 | 2/1985 | Matsuoka et al. | 62/212 |

FOREIGN PATENT DOCUMENTS 2044424 2/1980 United Kingdom .

OTHER PUBLICATIONS

*Refrigeration* vol. 59, No. 683, Kawanishi, Yasuhiro, "Multiple-Compressor Refrigerating Units for Supermarket", Sep. 1984.

*Primary Examiner*—Harry B. Tanner
*Attorney, Agent, or Firm*—Cushman, Darby & Cushman

[57] ABSTRACT

Refrigerating apparatus including a compressor, condensor and a plurality of evaporators which are connected in parallel and controlled by individual electromagnetic valves in response to temperature changes of individual evaporators. The refrigerating apparatus also includes an inverter circuit and a bypass circuit which causes refrigerant to flow from output side of the condenser to the input side of the compressor. When the temperature of the bypass circuit drops because of operation of the electromagnetic valves, the inverter circuit adjusts the operating frequency of the compressor.

5 Claims, 2 Drawing Figures

U.S. Patent    Apr. 21, 1987    4,658,596
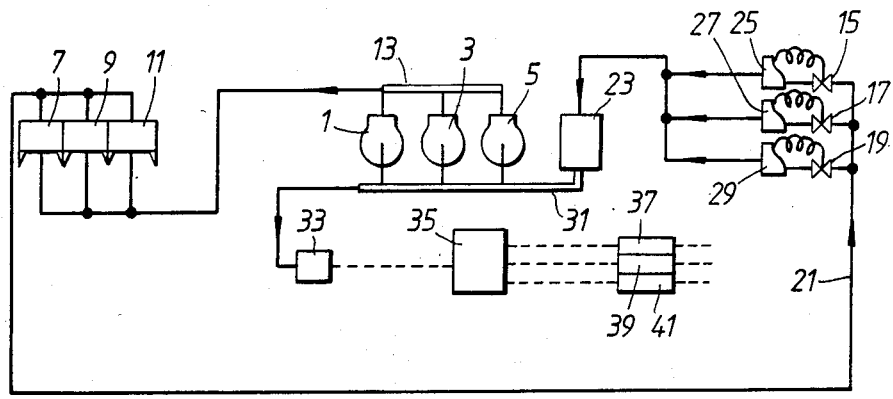
FIG. I.
(PRIOR ART)
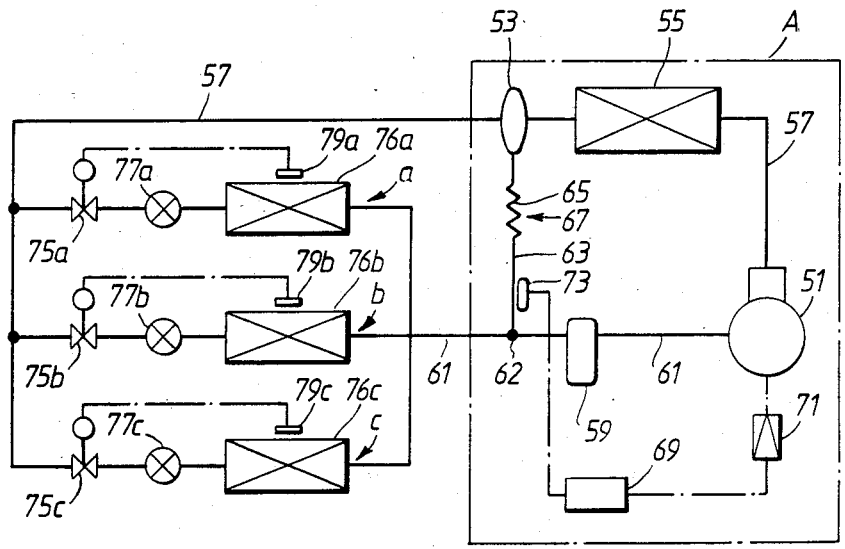
FIG. 2.

REFRIGERATING APPARATUS WITH SINGLE COMPRESSOR AND MULTIPLE EVAPORATORS

BACKGROUND OF THE INVENTION

1. Field of the invention

The present invention relates to refrigerating apparatus, and in particular, to an improvement in a multiple-type refrigerating apparatus for an air-conditioner, freezer or display case.

2. Description of the prior art

A well known prior art refrigerating apparatus, a so-called multiple-compressor refrigerator, is shown in FIG. 1. The exhaust-sides of each of a plurality of compressors 1, 3 and 5 are communicated to parallel connected condensers 7, 9 and 11 through a refrigerant discharge pipe 13. The output sides of condensers 7, 9 and 11 are collectively connected to parallel connected electromagnetic valves 15, 17 and 19, through a refrigerant pipe 21 which includes a capillary element (not shown). Electromagnetic valves 15, 17 and 19 are connected to an accumulator 23 through individual evaporators 25, 27 and 29. Electromagnetic valves 15, 17 and 19 include individual thermostats (not shown) which are provided on evaporators 25, 27 and 29 respectively. When the temperatures of evaporators 25, 27, or 29 reach a predetermined low temperature, a corresponding electromagnetic valve 15, 17 or 19 is closed automatically. Accumulator 23 is connected to the suction sides of compressors 1, 3 and 5 through a refrigerant intake pipe 31.

A pressure sensor 33, communicated to refrigerant intake pipe 31, is electrically connected to an electronic control circuit 35. Pressure sensor 33 detects refrigerant suction pressure of the suction sides, i.e. low pressure side, of the compressors. Electronic control circuit 35 is connected to magnetic switches 37, 39 and 41 which are individually provided on compressors 1, 3 and 5. Magnetic switches 37, 39 and 41 turn corresponding compressors 1, 3 and 5 on and off respectively in response to the output signal of electronic control circuit 35.

The operation of the above-described refrigerating cycle will be described hereinafter. When compressors 1, 3, and 5 are actuated, refrigerant circulates through evaporators 25, 27 and 29. At this moment, compressors 1, 3 and 5 are actuated at the same operating frequency and at the same rotary speed. Respective evaporators 25, 27 and 29 therefore operate identically. If the temperature of one of evaporators, e.g. evaporator 25, falls below a prescribed temperature due to its refrigeration load or other environmental condition, the corresponding electromagnetic valve 15 is closed and the refrigerant flowing into evaporator 25 is stopped. The low pressure side of the refrigerant (the suction sides of the compressors) therefore falls below a prescribed value and pressure sensor 33 detects this pressure fall and sends a signal to electronic control circuit 35. The electronic control circuit compares the signal with a set value to control respective compressors 1, 3 and 5. That is, one of compressors 1, 3 and 5 is stopped and the others are operated. The amount of refrigerant circulated is reduced, the pressure of the suction side of the compressors gradually rises and the refrigerating cycle suited to the number of evaporators which have been opened by the electromagnetic valves is effective.

In this arrangement, a variable refrigerating cycle is provided by a plurality of compressors and condensers corresponding to the number of the compressors. Thus, installation space and operating costs are very large. There is also the disadvantage that it is not always possible to achieve optimum conditions because it is only possible to carry out stepwise control in correspondence to the number of compressors.

It has been proposed to apply an analogue control system, a so-called inverter control system, in which the operating frequency of a single compressor is controlled by an inverter circuit and thus achieve optimum operating conditions.

According to this control system, a single compressor, and a common condenser can be used to reduce installation space and manufacturing costs. It further has another advantage that the optimum control is possible because of stepless frequency control. However, the control section of the inverter circuit receives signals from a pressure sensor which detects the pressure side (suction side) of the compressor as in a conventional system. There are many errors in pressure measurement, and sensors in which errors are reduced are extremely expensive. These improved sensors have an adverse effect on costs. The detection of pressure of the low pressure side means detecting the pressure at the return side of a refrigerating cycle, i.e. the pressure of the refrigerant just before return to the compressor. Response is slow and it is difficult to detect slight changes of pressure.

SUMMARY OF THE INVENTION

An object of the present invention is to provide an improved refrigerator with accurate compressor drive control and good response.

This is achieved by detecting the temperature of refrigerant flowing through a bypass at the outlet of the compressor. When one evaporator is closed the bypass temperature falls and the operating frequency of the compressor is adjusted.

BRIEF DESCRIPTION OF THE ACCOMPANYING DRAWINGS

The invention will be better understood by reference to the accompanying drawings, wherein:

FIG. 1 is a circuit diagram of a conventional refrigerating cycle; and

FIG. 2 is a circuit diagram of an embodiment of this invention.

DETAILED DESCRIPTION OF THE PREFERRED EXEMPLARY EMBODIMENT

A preferred embodiment of the present invention will be now described in more detail with reference to FIG. 2. The discharge port of a single compressor 51 is communicated to a liquid tank 53 through a condenser 55 by means of a forward side refrigerant pipe 57, and the intake port thereof is communicated to the refrigerant discharge side of an accumulator 59 by a return side refrigerant pipe 61. One of the output sides of liquid tank 53, constituting a liquid line, is connected to an intermediate portion 62 of refrigerant pipe 61 located at the refrigerant intake side of accumulator 59 through a bypass pipe 63 which has a throttle 65 such as e.g. a capillary tube. A bypass circuit 67 is formed of the bypass pipe 63 and throttle 65. Compressor 51 is electrically connected to electronic control circuit 69 through inverter circuit 71 which controls its operating frequency. A temperature sensor 73, e.g. a thermister, which is electrically connected to electronic control circuit 69, is coupled to the intermediate portion of bypass pipe 63 between throttle 65 and refrigerant pipe 61, so that it detects the temperature of the refrigerant in the intermediate portion of bypass pipe 63. Refrigerator unit A includes all of the above-described elements.

Another output side of liquid tank 53 is connected through refrigerant pipe 57 to parallel connected electromagnetic valves 75a, 75b and 75c, each connected to the input sides of respective evaporators 76a, 76b and 76c, e.g. display cases, through expansion valves 77a, 77b and 77c respectively. The output sides of evaporators 76a, 76b and 76c are collectively connected to the input side of accumulator 59 through refrigerant pipe 61. Temperature detectors 79a, 79b and 79c of individual electromagnetic valves 76a, 76b and 76c detect the temperature of respective evaporators 76a, 76b and 76c. As there are three systems including an electromagnetic valve, expansion valve and evaporators in this Figure, for convenience of description these systems will be referred to as system a, system b and system c.

The operation of the above-described refrigerating cycle is now described. When compressor 51 is actuated at a suitable operating frequency corresponding to the number of evaporators to be operated, refrigerant circulates. If the temperatures of individual evaporators 76a, 76b and 76c are above a predetermined value refrigeration is performed by each of evaporators 76a, 76b and 76c.

If the temperature of evaporator 76a (system a), for example, drops because of the load conditions or for other reason, temperature detector 79a detects this temperature drop and electromagnetic valve 76a of system a is closed in response to this detection. Hereupon, the pressure of low pressure side 62, i.e. the intake side of compressor 51, falls because refrigerant flows through only evaporators 76b and 76c of system b and c. The amount of the refrigerant flowing into bypass circuit 67 from liquid tank 53, at this time, is increased with the fall of the pressure of low pressure side 62. Therefore, the temperature of the refrigerant flowing through throttle 65 falls and the temperature of bypass pipe 63, where temperature sensor 73 is provided, also drops. Temperature sensor 73 detects this temperature-drop, and sends a signal corresponding to the detected temperature to electronic control circuit 69. Electronic control circuit 69 compares the signal, i.e. detected temperature fed from sensor 73 with a prescribed temperature. If the detected temperature is lower than the prescribed temperature, electronic control circuit 69 changes a control signal in correspondence to the difference of the temperatures and sends it to inverter circuit 71.

Based on the control signal, therefore, inverter circuit 71 lowers the operating frequency of compressor 51. When the operating frequency of compressor 51 is lowered, the refrigerant circulating in the entire refrigeration circuit is reduced and the pressure of low pressure side 62 rises again. Consequently, the amount of refrigerant flowing into bypass circuit 67 from liquid tank 53 is reduced, and the temperature of bypass pipe 62 rises and finally returns to the prescribed temperature.

As described in detail above, the operating frequency of the compressor is changed in accordance with number of operating evaporators, so that it enables a saturated temperature (vapor temperature of evaporator) in correspondence to the pressure of the low pressure side to be kept at a constant value. Further, the temperature sensor provided on the bypass pipe can respond quickly to and detect accurately the slight temperature changes of refrigerant at the low pressure side, thereby achieving optimum control of the operating frequency of the compressor.

Many changes and modifications in the above-described embodiment can be carried out without departing from the scope of the present invention. That scope is intended to be limited only by the scope of the appended claims.

What is claimed is:

1. A refrigerating apparatus with multiple evaporators comprising:
   means for compressing refrigerant;
   means for condensing the refrigerant fed from the output side said compressing means;
   a plurality of evaporating means, connected in parallel with one another, for evaporating the refrigerant from said condensing means;
   a plurality of valve means, one of said valve means being connected in series with each said evaporating means, respectively, for controlling the flow of refrigerant through a corresponding one of said evaporating means;
   means for bypassing the refrigerant from an output side of said condensing means to an input side of said compressing means;
   means for detecting the temperature of said bypassing means to indicate the pressure changes of the refrigerant at the input side of said compressing means occuring when each of said evaporating means is controlled by said corresponding valve means; and
   means for adjusting the capacity of said compressing means in response to the temperature of said bypass means detected by said detecting means.

2. The apparatus according to claim 1, wherein said plurality of valve means further includes temperature sensing means of the same number as said evaporating means to individually detect temperatures of each of said evaporating means, and wherein each of said valve means stops the refrigerant flowing into said corresonding evaporating means in response to the detected temperature of each of evaporating means.

3. The apparatus according to claim 1, wherein said bypassing means includes throttle means for throttling the refrigerant flowing through said bypassing means, said detecting means being disposed on an output side of said throttle means.

4. The apparatus according to claim 1 wherein said compressing means is a single compressor.

5. The apparatus according to claim 4, wherein said compressing means includes a single compressor and said adjusting means adjusts a capacity of said single compressor by adjusting the operating frequency of said single compressor in response to the temperature of said bypassing means.

* * * * *

UNITED STATES PATENT AND TRADEMARK OFFICE
CERTIFICATE OF CORRECTION

PATENT NO.  : 4,658,596
DATED       : Apr. 21, 1987
INVENTOR(S) : Eiji KUWAHARA

It is certified that error appears in the above-identified patent and that said Letters Patent is hereby corrected as shown below:

ON THE FIRST INFORMATION PAGE:

Change "[73]  Kabushiki Kaisha Toshiba, Tokyo, Japan to --Kabushiki Kaisha Toshiba --

Signed and Sealed this

Ninth Day of February, 1988

Attest:

DONALD J. QUIGG

*Attesting Officer*   *Commissioner of Patents and Trademarks*